(12) United States Patent

Hindawi et al.

(10) Patent No.: US 12,614,141 B1
(45) Date of Patent: Apr. 28, 2026

(54) CURVE-BASED GRAPHICAL USER INTERFACE ELEMENT GENERATION FOR TECHNOLOGY ASSESSMENT METRICS

(71) Applicant: Tanium Inc., Emeryville, CA (US)

(72) Inventors: Orion Hindawi, Seattle, WA (US); Daniel Varga, Rolesville, NC (US); Nathan Dauber, Saint Louis, MO (US); Young Sung Kim, Lewisville, TX (US)

(73) Assignee: Tanium Inc., Emeryville, CA (US)

( * ) Notice: Subject to any disclaimer, the term of this patent is extended or adjusted under 35 U.S.C. 154(b) by 375 days.

(21) Appl. No.: 18/456,477

(22) Filed: Aug. 25, 2023

Related U.S. Application Data

(60) Provisional application No. 63/502,918, filed on May 17, 2023.

(51) Int. Cl.
    *G06F 3/048*     (2013.01)
    *G06Q 10/0639*     (2023.01)
    G06F 3/04847     (2022.01)

(52) U.S. Cl.
    CPC ... *G06Q 10/06393* (2013.01); *G06F 3/04847* (2013.01)

(58) Field of Classification Search
    CPC ......... G06Q 10/06393; G06Q 10/0635; G06Q 10/0639; G06Q 10/06395; G06F 3/0481; G06F 3/0484; G06F 3/0486; G06F 3/0488; G06F 3/04847
    See application file for complete search history.

(56) References Cited

U.S. PATENT DOCUMENTS

| | | |
|---|---|---|
| D420,340 S | 2/2000 | Bailer et al. |
| D462,077 S | 8/2002 | Greminger |
| D490,438 S | 5/2004 | Greminger |
| D525,629 S | 7/2006 | Chotai et al. |

(Continued)

FOREIGN PATENT DOCUMENTS

CN      306928725 S      11/2021

OTHER PUBLICATIONS

"Asset Details," Apr. 27, 2023, 4 pages, Qualys, Inc.

(Continued)

*Primary Examiner* — Vijay Shankar
(74) *Attorney, Agent, or Firm* — Nicholson De Vos Webster & Elliott LLP

(57) ABSTRACT

A device may generate information to cause the display of a graphical user interface (GUI) element reflecting how a selected enterprise network is performing on a technology assessment metric relative to other enterprise networks, where the generating includes: determining, based on data values reflecting individual performance of the plurality enterprise networks on the technology assessment metric, a part of a normal distribution curve to be shown, a first point to be shown on the part of the normal distribution curve indicating a percentile for the data value reflecting the individual performance of the selected enterprise network, and a second point along the part of the normal distribution curve reflecting a goal for the individual performance of the selected enterprise network. A device may send, to a client device, the information to cause the GUI element to be presented in a dashboard on the graphical user interface of the client device.

20 Claims, 8 Drawing Sheets

(56) References Cited

U.S. PATENT DOCUMENTS

| | | | | |
|---|---|---|---|---|
| D711,898 | S | 8/2014 | Edman | |
| D717,818 | S | 11/2014 | Varon et al. | |
| D720,767 | S | 1/2015 | Miller et al. | |
| 9,239,672 | B2 * | 1/2016 | Kraut | G06F 3/0486 |
| 9,246,773 | B2 * | 1/2016 | Degioanni | H04L 41/22 |
| D768,670 | S | 10/2016 | Edman | |
| D769,916 | S | 10/2016 | Edman | |
| D778,928 | S | 2/2017 | Bertnick et al. | |
| D782,498 | S | 3/2017 | Krafft | |
| D789,409 | S | 6/2017 | Edman | |
| D792,452 | S | 7/2017 | Edman | |
| D795,907 | S | 8/2017 | Edman | |
| D795,908 | S | 8/2017 | Edman | |
| D829,752 | S | 10/2018 | Chauhan et al. | |
| D839,294 | S | 1/2019 | Mazlish et al. | |
| D842,876 | S | 3/2019 | Edman | |
| D864,219 | S | 10/2019 | Farnan et al. | |
| D900,125 | S | 10/2020 | Mcglasson et al. | |
| D980,232 | S | 3/2023 | Farnan et al. | |
| D1,004,613 | S | 11/2023 | Shen et al. | |
| 2012/0272186 | A1 | 10/2012 | Kraut | |
| 2015/0052441 | A1 | 2/2015 | Degioanni | |
| 2017/0272453 | A1 | 9/2017 | Murray et al. | |
| 2021/0304207 | A1 * | 9/2021 | Lo Faro | G06Q 40/02 |
| 2022/0292999 | A1 * | 9/2022 | Kratzer | G06N 20/00 |
| 2022/0327172 | A1 * | 10/2022 | Davies | G06F 16/285 |

OTHER PUBLICATIONS

"Asset Details," Sep. 15, 2022, 4 pages, downloaded from https://qualysguard.qg2.apps.qualys.com/portal-help/en/vm/assets/asset_details.htm.

"BitSight Advisor Services for Third-Party Risk Continuous Monitoring," 2023, 2 pages, BitSight Technologies, Inc.

"BitSight Advisor Services for Third-Party Risk Assessments," 2023, 2 pages, BitSight Technologies, Inc.

"BitSight Attack Surface Analytics," 2020, 2 pages, BitSight Technologies, Inc.

"BitSight for executive cybersecurity reporting," 2023, 12 pages, BitSight Technologies, Inc.

"BitSight Peer Analytics, Advanced Security Benchmarking," 2023, 1 page, Bitsight.

"BitSight Security Ratings Correlate to Ransomware," 2023, 2 pages, BitSight.

"Third-Party Vulnerability Detection & Response," 2023, 1 page, Bitsight.

"BitSight Vendor Risk Management," 2023, 1 page, Bitsight.

"Bubble Widget," May 8, 2023, 3 pages, Qualys, Inc.

"Build cyber resilience with Bitsight's advanced cybersecurity analytics," 2023, 12 pages, BitSight Technologies, Inc.

"Calculating TruRisk Score," Sep. 15, 2022, 3 pages, downloaded from https://qualysguard.qg2.apps.qualys.com/portal-help/en/vm/threat/calculating_asset_risk_score.htm.

"Calculating TruRisk Score," Apr. 27, 2023, 3 pages, Qualys, Inc.

"Configure Report Templates," Sep. 29, 2022, 2 pages, downloaded from https://qualysguard.qg2.apps.qualys.com/qwebhelp/fo_portal/reports/scan_reports/win_scan_template.htm.

"Cyber Security Vulnerability Assessment," 2023, 6 pages, Bitsight Technologies, Inc.

"Cybersecurity Benchmarking & Security Performance Management," 2023, 14 pages, Bitsight.

"Display TruRisk Details (ARS, ACS, QDS) in Reports," Sep. 29, 2022, 4 pages, downloaded from https://qualysguard.qg2.apps.qualys.com/qwebhelp/fo_portal/reports/trurisk_details.htm.

"External Attack Surface Management (EASM)," Apr. 23, 2023, 2 pages, Qualys, Inc.

"External Attack Surface Reports," Apr. 23, 2023, 14 pages, Qualys, Inc.

"Free sneak peek report of third party vendors," 2023, 5 pages, Bitsight Technologies, Inc.

"Get Started with VMDR," Apr. 27, 2023, 5 pages, Qualys, Inc.

"Get Started with VMDR", Sep. 15, 2022, 5 pages, downloaded from https://qualysguard.qg2.apps.qualys.com/portal-help/en/vm/get_started/get_started.htm.

"Knowing Widgets," May 8, 2023, 2 pages, Qualys, Inc.

"Manage Asset and Vulnerability Details," Apr. 27, 2023, 2 pages, Qualys, Inc.

"Managing External Attack Surface Management (EASM) Dashboard," Apr. 23, 2023, 3 pages, Qualys, Inc.

"Prioritize Vulnerabilities using Qualys TruRisk," Sep. 15, 2022, 5 pages, downloaded from https://qualysguard.qg2.apps.qualys.com/portal-help/en/vm/threat/qualys_trurisk.htm.

"Prioritize Vulnerabilities using Qualys TruRisk," Apr. 27, 2023, 4 pages, Qualys, Inc.

"Prioritize your Vulnerabilities," Sep. 15, 2022, 1 page, downloaded from https://qualysguard.qg2.apps.qualys.com/portal-help/en/vm/threat/prioritize_your_vulnerabilities.htm.

"Prioritize your Vulnerabilities," Apr. 27, 2023, 1 page, Qualys, Inc.

"Qualys API Quick Reference," Apr. 27, 2023, 73 pages, Qualys, Inc.

"Qualys App for Splunk Enterprise with TA," Mar. 29, 2023, 81 pages, User Guide Version 1.10.9., Qualys, Inc.

"Qualys for ITSM, User Guide," Sep. 16, 2022, 57 pages, Qualys, Inc., downloaded from https://www.qualys.com/docs/qualys-itsm-user-guide.pdf.

"Qualys Insights," Apr. 27, 2023, 5 pages, Qualys, Inc.

"Qualys OpenSSL Service Playbook," Dec. 2, 2022, 13 pages, Qualys, Inc., downloaded from https://www.qualys.com/docs/qualys_openssl_playbook.pdf.

"Qualys TotalCloud FlexScan Playbook," Mar. 28, 2023, 14 pages, Qualys, Inc., downloaded from https://www.qualys.com/docs/qualys_totalcloud_playbook.pdf.

"Qualys VMDR for ITSM, User Guide," Jun. 14, 2022, 56 pages, Qualys, Inc., downloaded from https://www.qualys.com/docs/qualys-vmdr-itsm-user-guide. pdf.

"Qualys VMDR TruRisk, FixIT, and ProtectIT Playbook, More Security with Less Complexity," Feb. 13, 2023, 13 pages, downloaded from https://www.qualys.com/docs/qualys-vmdr-trurisk-packages-playbook.pdf.

"Reporting Schedule," May 8, 2023, 7 pages, Qualys, Inc.

"Risk Score Widget," Sep. 15, 2022, 2 pages, downloaded from https://qualysguard.qg2.apps.qualys.com/ud/help/widgets/risk_score_widget.htm.

"Search Tokens for Dynamic Tagging," Apr. 27, 2023, 2 pages, Qualys, Inc.

"Security Ratings Preview," 2023, 1 page, Bitsight.

"Security, Public Information Security Statement," Oct. 24, 2022, 10 pages.

"Tanium Benchmark, Compare and prescriptively improve your IT risk metrics against your industry peers," 2022, 3 pages, Tanium.

"Tanium™ Benchmark User Guide", Mar. 9, 2023, 64 pages, Version 2.1.103, Tanium, Inc.

"Tanium™ Benchmark User Guide," Jan. 24, 2023, 64 pages, Version 2.1.96, Tanium, Inc.

"Tanium™ Benchmark User Guide," Feb. 21, 2023, 64 pages, Version 2.1.97, Tanium, Inc.

"Tanium™ Trends User Guide," Mar. 14, 2023, 77 pages, Version 3.9.324, Tanium, Inc.

"Third-Party Risk Portfolio Report," 2023, 2 pages, Bitsight.

"TruRisk Score for Assets," Apr. 23, 2023, 3 pages, Qualys, Inc.

"TruRisk Score Range in Multi-Grouped Table widget," Apr. 27, 2023, 2 pages, Qualys, Inc.

"TruRisk Score Widget," May 8, 2023, 2 pages, Qualys, Inc.

"TruRisk Score Widget," Nov. 15, 2022, 2 pages, downloaded from https://docs.qualys.com/en/ud/latest/widgets/risk_score_widget.htm.

"TruRisk Score Widget," Apr. 27, 2023, 2 pages, Qualys, Inc.

"Understanding Asset Risk Score," Sep. 15, 2022, 1 pages, downloaded from https://qualysguard.qg2.apps.qualys.com/portal-help/en/vm/threat/understanding_asset_risk_score.htm.

(56) References Cited

OTHER PUBLICATIONS

"Understanding the Qualys Detection Score," Sep. 15, 2022, 1 pages, downloaded from https://qualysguard.qg2.apps.qualys.com/portal-help/en/vm/threat/understanding_the_qualys_detection_score.htm.

"VMDR Getting Started Guide," Jun. 8, 2022, 20 pages, Qualys, Inc., downloaded from https://www.qualys.com/docs/qualys-vmdr-getting-started-guide.pdf.

"View Assets in CSAM," Apr. 23, 2023, 12 pages, Qualys, Inc.

"View Assets in GAV," Apr. 19, 2023, 11 pages, Qualys, Inc.

"Viewing Inventory of External Attack Surface Discovered Assets from the EASM Tab," Apr. 23, 2023, 5 pages, Qualys, Inc.

"Viewing Inventory of External Attack Surface Discovered Assets from the Inventory Tab," Apr. 23, 2023, 5 pages, Qualys, Inc.

"Vulnerability Details," Apr. 27, 2023, 6 pages, Qualys, Inc.

"What Is Attack Surface?," 2023, 7 pages, BitSight Technologies, Inc.

"Your Scan Report," Sep. 29, 2022, 5 pages, downloaded from https://qualysguard.qg2.apps.qualys.com/qwebhelp/fo_portal/reports/scan_reports/win_scan_report.htm.

Rachel Holmes, "How to Create the Right Cybersecurity Board Report, Security Performance Management," Feb. 28, 2023, 4 pages, BitSight Technologies, Inc.

Steve Zurier, "The security ratings game grades third-party vendors," Sep. 2016, 6 pages, Tech Target, downloaded from https://www.techtarget.com/searchsecurity/feature/The-security-ratings-game-grades-third-party-vendors.

Net Vector. "Intelligent technology hud vector interface." Shutterstock, published Jan. 14, 2018 (Retrieved from the Internet Feb. 28, 2025). Internet URL: <https://www.shutterstock.com/image-vector/intelligent-technology-hud-vector-interface-network-794330365> (Year: 2018).

Notice of Allowance, U.S. Appl. No. 29/876,210, Mar. 13, 2025, 11 pages.

Notice of Allowance, U.S. Appl. No. 29/876,211, Mar. 18, 2025, 11 pages.

Wiggers, Steef-Jan. "Google Kubernetes Engine Upgrades: Regional Clusters, New Dashboard and Security Recommendations." InfoQ, published Dec. 22, 2017 (Retrieved from the Internet Feb. 28, 2025). Internet URL: <https://www.infoq.com/news/2017/12/gke-upgrades-dashboard/> (Year: 2017).

* cited by examiner

Electronic Device 300

Software Instances 302

304A

Instance 306

304R

Virtualization Layer 308

Hardware 320

Processor(s) 322

Network interface(s) 324

Machine-Readable Media 326

Software 328

Curve Element Determiner 115

Figure 4:
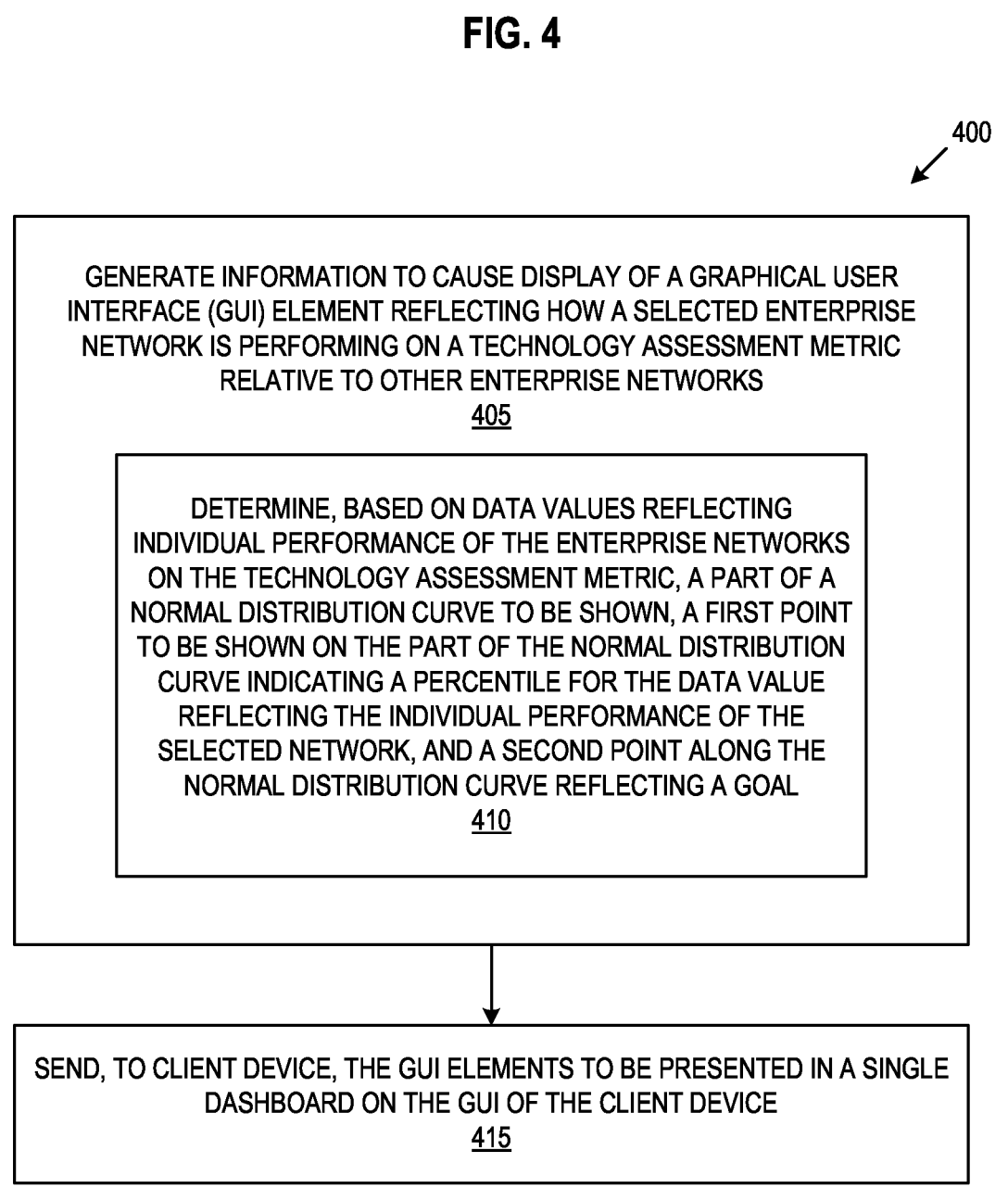

GENERATE INFORMATION TO CAUSE DISPLAY OF A GRAPHICAL USER INTERFACE (GUI) ELEMENT REFLECTING HOW A SELECTED ENTERPRISE NETWORK IS PERFORMING ON A TECHNOLOGY ASSESSMENT METRIC RELATIVE TO OTHER ENTERPRISE NETWORKS
405

DETERMINE, BASED ON DATA VALUES REFLECTING INDIVIDUAL PERFORMANCE OF THE ENTERPRISE NETWORKS ON THE TECHNOLOGY ASSESSMENT METRIC, A PART OF A NORMAL DISTRIBUTION CURVE TO BE SHOWN, A FIRST POINT TO BE SHOWN ON THE PART OF THE NORMAL DISTRIBUTION CURVE INDICATING A PERCENTILE FOR THE DATA VALUE REFLECTING THE INDIVIDUAL PERFORMANCE OF THE SELECTED NETWORK, AND A SECOND POINT ALONG THE NORMAL DISTRIBUTION CURVE REFLECTING A GOAL
410

SEND, TO CLIENT DEVICE, THE GUI ELEMENTS TO BE PRESENTED IN A SINGLE DASHBOARD ON THE GUI OF THE CLIENT DEVICE
415

Figure 7A:
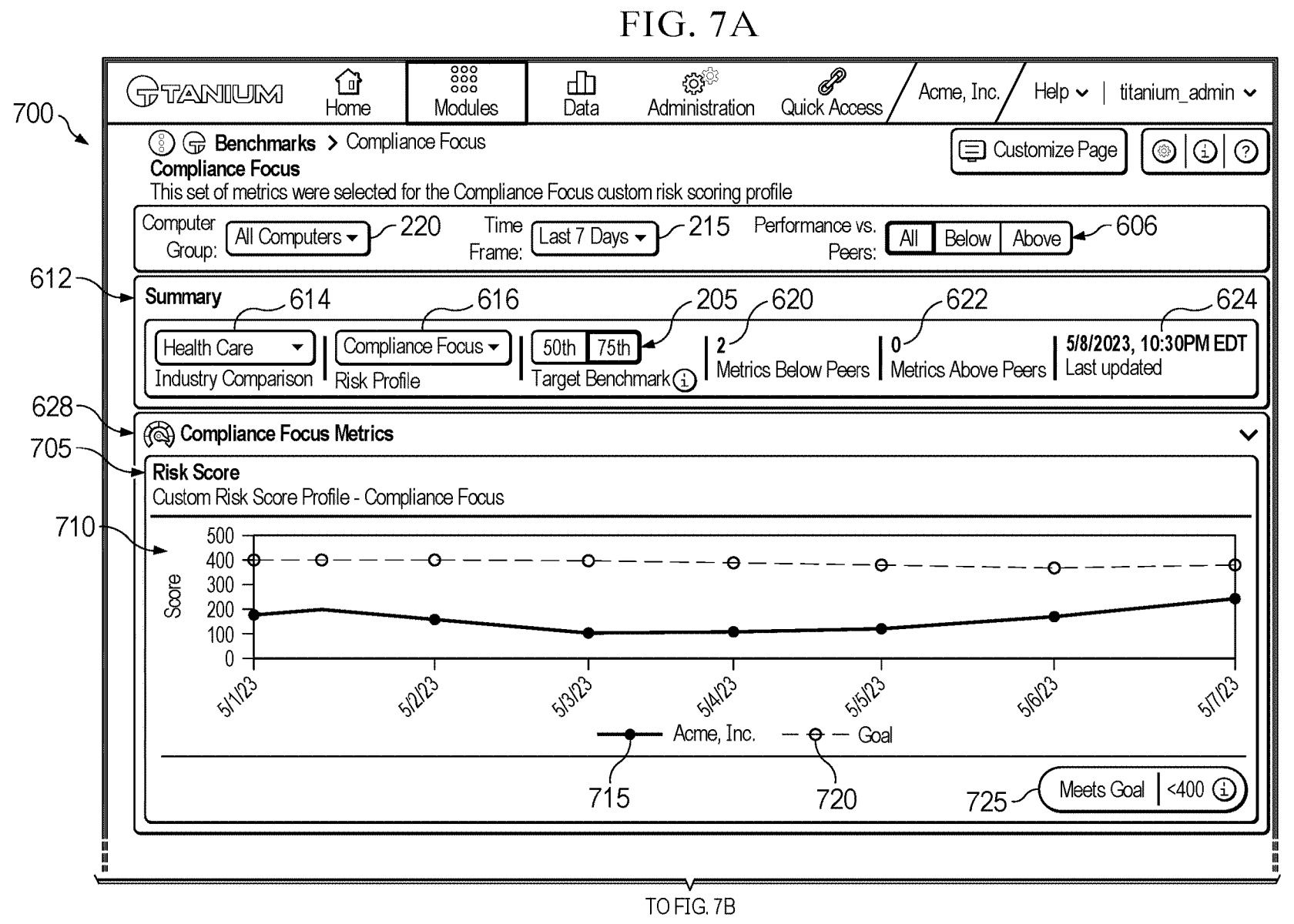

TANIUM  Home  Modules  Administration  Quick Access  |  Acme, Inc.  /  Help  ∨  |  titanium_admin  ∨

Benchmarks > Compliance Focus                    Customize Page

Compliance Focus
This set of metrics were selected for the Compliance Focus custom risk scoring profile Computer Group:  All Computers ▼  — 220    Time Frame:  Last 7 Days ▼  — 215    Performance vs. Peers:  All  Below  Above  — 606

Summary — 614

Health Care  ▼ — 616    Compliance Focus ▼ — 620    50th  75th — 622    205    624
Industry Comparison  |  Risk Profile  |  Target Benchmark ⓘ  |  2 | Metrics Below Peers | 0 | Metrics Above Peers    5/8/2023, 10:30PM EDT | Last updated 628 — Compliance Focus Metrics

705 — Risk Score
Custom Risk Score Profile - Compliance Focus

710

Score 500
400
300
200
100
0

5/1/23   5/2/23   5/3/23   5/4/23   5/5/23   5/6/23   5/7/23

● Acme, Inc. — 715    ○ Goal — 720

Meets Goal | <400  ⓘ — 725

CURVE-BASED GRAPHICAL USER INTERFACE ELEMENT GENERATION FOR TECHNOLOGY ASSESSMENT METRICS

CROSS-REFERENCE TO RELATED APPLICATIONS

This application claims the benefit of U.S. Provisional Application No. 63/502,918, filed May 17, 2023, which is hereby incorporated by reference.

TECHNICAL FIELD

One or more embodiments relate to the field of infrastructure assessment; and more specifically, to the assessment of the technical controls or other IT infrastructure elements within an enterprise network.

BACKGROUND ART

An organization sometimes has a need to perform a cyber risk assessment of the technical controls of a target or selected enterprise network (the organization's own network and/or that of another organization). For instance, the organization wants to measure how the target enterprise network stands against competing organizations' networks. Also, there are many metrics that can be used to measure cyber risk, and it is difficult to know which metrics to prioritize for improvement. Additionally, people within an organization without in-depth knowledge of cyber risks and network setup may need to be able to understand this cyber risk assessment.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 4 illustrates a flow diagram for analyzing technology assessment metrics for a group of enterprise networks and generating a curve-based GUI element based on the analysis according to some example embodiments.

FIGS. 7A and 7B illustrate another exemplary graphical user interface for displaying a configured combination of technology assessment metrics for a group of enterprise networks according to some example embodiments.

DETAILED DESCRIPTION

Figure 1:
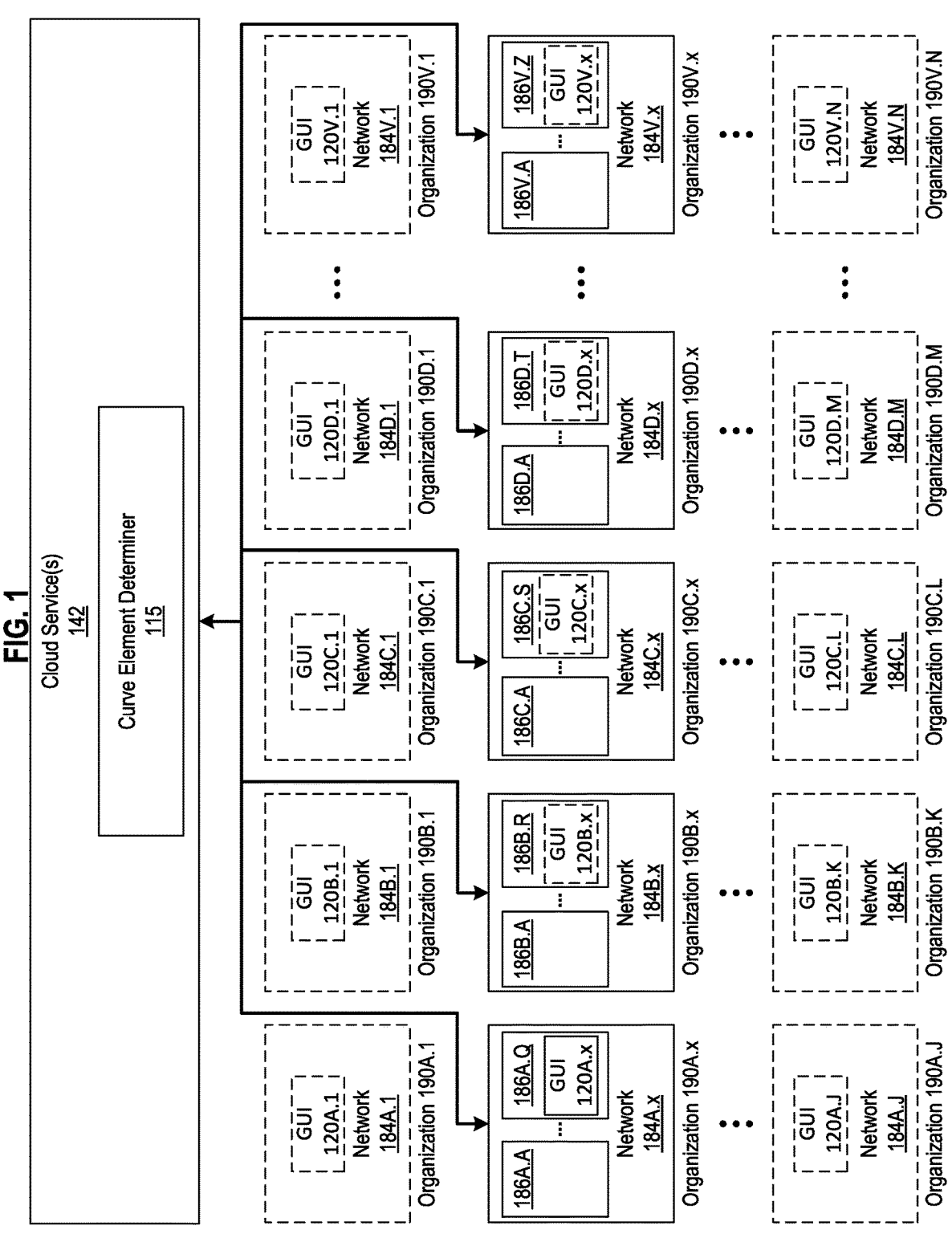
FIG. 1 is a block diagram illustrating a technique for analyzing technology assessment metrics for a group of enterprise networks and generating a curve-based graphical user interface (GUI) element(s) based on the analysis according to some example embodiments.

The following description describes embodiments for, among other things, performing an assessment (e.g., a cyber risk assessment of the technical controls, other IT infrastructure assessments, etc.) of a selected (or target) organization's enterprise network. In this description, the figure(s) illustrating block diagrams sometimes refer to the figure(s) illustrating flow diagrams, and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa. FIG. 1

FIG. 1 is a block diagram illustrating a technique for analyzing technology assessment metrics for a group of enterprise networks and generating a curve-based GUI element based on the analysis according to some example embodiments. As shown in FIG. 1, curve element determiner 115 receives data from many different networks and can compile and/or analyze the data. Using the compiled/analyzed data, curve element determiner 115 can provide information to cause the display of curve-based GUI elements on one or more of the electronic devices 186 to determine how a selected network compares to other networks. By providing intuitive curve-based GUI elements, users of the electronic devices can easily and accurately determine which technology assessment metrics need to be addressed and how best to spend resources to address them.

Several of the reference numbers use the format #α.β to illustrate different organizations and their networks. More specifically, the organizations and their networks are organized in a grid of rows and columns to logically represent relationships between them. For instance, those in the same row may be considered peers based on some measure (e.g., the organizations are competitors, the networks are of a similar type, etc.), while those in different rows may be considered to have a supplier to customer relationship. In the numbering format, a is a letter used to distinguish different horizontal instances (different rows), and β is a number used to distinguish different vertical instances (different columns). The notation #α.x, where x is a single integer value (e.g., 1), identifies a single row of organizations and their networks. Thus, a horizontal instance can be peers distinguished from each other by their a letter but which share the same β number. Different organizations on a given row may be competing suppliers to competing vendors on another row. Thus, organizations 190A.x may be competing suppliers for an organization 190A.1. A supply chain for a given organization 190α.x can be represented by one or more of the organizations on each of the other rows. For instance, a supply chain for an organization 190B.1 may include organization 190A.x and organization 190D.M. As another example, a supply chain for organization 190A.x may include organization 190D.M.

Organization, networks, and GUIs surrounded by a dotted line can be seen as optional. Thus, while embodiments are illustrated in which the groups of organizations to be compared are peers (all organizations in a single row), other embodiments may additionally or alternatively support different groupings of organizations for comparison (e.g., less than all organization in a single row, all organizations in a single supply chain, all of the organizations irrespective of their relationship to each other).

The networks 184 are sometimes called enterprise networks, information technology (IT) networks, managed networks, and organizations' networks, and represent the information technology (IT) infrastructure that an organization uses. A given one of the networks 184 may be a local area network (LAN) with a firewall through which traffic to and from the LAN passes to reach the cloud service(s) 142. As used herein, a "network" may include but is not limited to a combination of one or more electronic devices that communicate with and among one another. Exemplary networks may include one or combinations of an IP network (Information Technology using protocols such as Internet Protocol) network, an OT network (Operational Technology using a protocol such as DNP3, Modbus, Profibus), and IoT networks. Certain devices on a network may be connected intermittently or continuously. Network connectivity may include wired and wireless data transfer and may include both synchronous and asynchronous data transfer.

FIG. 1 shows different electronic devices 186 currently within each of the networks 184. The electronic devices 186 are referred to with the format 186x.x, where the first x distinguishes which of the network(s) 184 a given electronic device is currently connected to, and where the second x distinguishes electronic devices for each other. For instance, electronic devices 186A.A through 186A.Q are currently within network 184A.x of the organization 190A.x. Similarly, electronic devices 186B.A-B.R are currently within network 184B.x of the organization 190B.x. In some embodiments, at least some of the electronic devices within a given one of the networks 184 are distributed across different geographical areas and/or localized at the same physical location. Additionally or alternatively, the electronic devices within a given one of the networks 184 are divided into several sub-networks that are separated by one or more firewalls.

Curve element determiner 115 can analyze the received data values from enterprise networks 184 and generate information to cause the display of a type of GUI element reflecting how a selected enterprise network is performing on technology assessment metrics relative to the other enterprise networks. For example, curve element determiner 115 generates information to cause the display of a GUI element reflecting individual performance of the number of high severity vulnerabilities for network 184A.x relative to the received data values reflecting the individual performances of the numbers of high severity vulnerabilities for networks 184B.x through 184V.x.

In some embodiments, curve element determiner 115 generates information to cause the display of a curve for the received data values for the respective technology assessment metrics for a group of the networks 184. For example, curve element determiner 115 generates information to cause the display of part of a normal distribution curve using the mean and standard deviation of the received values for a group of the networks 184 for a given technology assessment metric. The width of the normal distribution curve therefore reflects the similarity of the data values (also referred to as relative commonality) of the group of the networks 184 for the technology assessment metric. For example, a narrow distribution curve indicates that the scores for different networks are similar and could therefore indicate that an industry standard already exists or is forming. Knowing whether an industry standard already exists or is forming can give an organization insight (e.g., in deciding how to allocate resources, in selecting a supplier or vendor). For example, if an organization's network has two technology assessment metrics that are below the average when compared to peer networks, the organization and/or curve element determiner 115 can determine priorities for the technology assessment metrics using the width of the distribution curves and/or the location of first indicator 240 to determine priority. For example, the organization and/or curve element determiner 115 may assign a higher priority for technology assessment metrics with: 1) first indicators 240 farther behind second indicator 245; and/or 2) narrower widths for the normal distribution curves. The organization will likely see better outcomes prioritizing the improvement of a technology assessment metric where an industry standard already exists or is forming since that industry standard likely reflects the expectations of suppliers and vendors in supply chains in which the organization would like to participate. Further details regarding the generation of curves are described with reference to FIG. 2.

In some embodiments, curve element determiner 115 determines a first point to be shown on the part of the normal distribution curve indicating a percentile for the data value for the selected network. For example, curve element determiner 115 determines the percentile for network 184A.x in the normal distribution curve for the given technology assessment metric. In some embodiments, curve element determiner 115 determines a second point to be shown on the part of the normal distribution curve reflecting a goal of the organization. For example, curve element determiner 115 determines a percentile goal for network 184A.x. In some embodiments, the percentile goal is set by a user of a client device. For example, a user interacts with a control GUI element of GUI 120A.x (e.g., goal selector 205 of FIG. 2) to select a goal which is presented as a percentile for the normal distribution curve. In some embodiments, curve element determiner 115 determines the goal as a default value and changes the goal to an alternative goal in response to receiving an indication from electronic device 186A.Q (in network 184A.x) that a user has interacted with the control GUI element of GUI 120A.x to select the alternative goal. In one embodiment, the default value of the goal is the $50^{th}$ percentile and the alternative goal is the $75^{th}$ percentile. Further details regarding point determination are described with reference to FIG. 2.

In some embodiments, curve element determiner 115 determines the group of the enterprise networks to be included in the generation of the normal distribution curve. For example, curve element determiner 115 receives an indication from the electronic device 186A.Q indicating that a user interacted with a control GUI element of GUI 120A.x (e.g., type selector 210 of FIG. 2) to select networks 184B.x and 184D.x. In response to receiving this indication, curve element determiner 115 generates information to cause the display of a part of a normal distribution curve based on data values for networks 184A.x, 184B.x, and 184D.x for the given technology assessment metric. In some embodiments, the indication received by curve element determiner 115 is a criteria for a type of network and curve element determiner 115 determines which networks satisfy the criteria. For example, curve element determiner 115 receives an indication to include networks in the health care industry, determines that networks 184B.x and 184D.x belong to the healthcare industry, and therefore generates information to cause the display of a part of a normal distribution curve based on data values for networks 184A.x, 184B.x, and 184D.x for the given technology assessment metric. Further details regarding type selection are described with reference to FIG. 2.

In some embodiments curve element determiner 115 determines a range of time over which to evaluate the technology assessment metric(s). For example, curve element determiner 115 receives an indication from electronic device 186A.Q indicating that a user interacted with a control GUI element of GUI 120A.x (e.g., time interval selector of FIG. 2) to select a range of time of seven days. In response to receiving this indication, curve element determiner 115 generates information to cause the display of a part of a normal distribution curve based on data values for the given technology assessment metric for the group of the networks over the previous seven-day period. Further details regarding time interval selection are described with reference to FIG. 2.

In some embodiments, curve element determiner 115 determines which electronic devices within the selected networks are included in the generation of the normal distribution curve. For example, curve element determiner 115 receives an indication from electronic device 186A.Q indicating that a user interacted with a control GUI element of GUI 120A.x (e.g., group selector 220 of FIG. 2) to select electronic devices (e.g., an indication that causes the selection of electronic devices 186B.C through 186B.G of network 184B.x and devices 186D.H through 186D.T of network 184D.x). In response to receiving this indication, curve element determiner 115 generates information to cause the display of a part of a normal distribution curve based on data values for the selected devices (e.g., devices 186B.C through 186B.G of network 184B.x and devices 186D.H through 186D.T of network 184D.x) for the given technology assessment metric. In some embodiments, the indication received by curve element determiner 115 is a criterion for a type of device and curve element determiner 115 determines which devices satisfy the criteria. For example, curve element determiner 115 receives an indication to include Macintosh® devices, determines that devices 186B.C through 186B.G of network 184B.x and devices 186D.H through 186D.T of network 184D.x are Macintosh® devices, and therefore generates information to cause the display of a part of a normal distribution curve based on data values for these electronic devices (and thus not the other electronic devices in those network). Further details regarding group selection are described with reference to FIG. 2. Although the description focuses on a user operating on the selected network (e.g., user operating on electronic device 186A.Q of selected network 184A.x), in some embodiments the user can be operating an electronic device in another of the networks or even outside of these networks. For example, a user of network 184A.1 could select network 184B.x to determine how organization 190B.x compares to organizations 190A.x through 190V.x. Alternatively, a user of network 184A.x could select network 184A.J to determine how organization 190A.J compares to its peers (organizations 190B.K to 190V.N).

Figure 2:
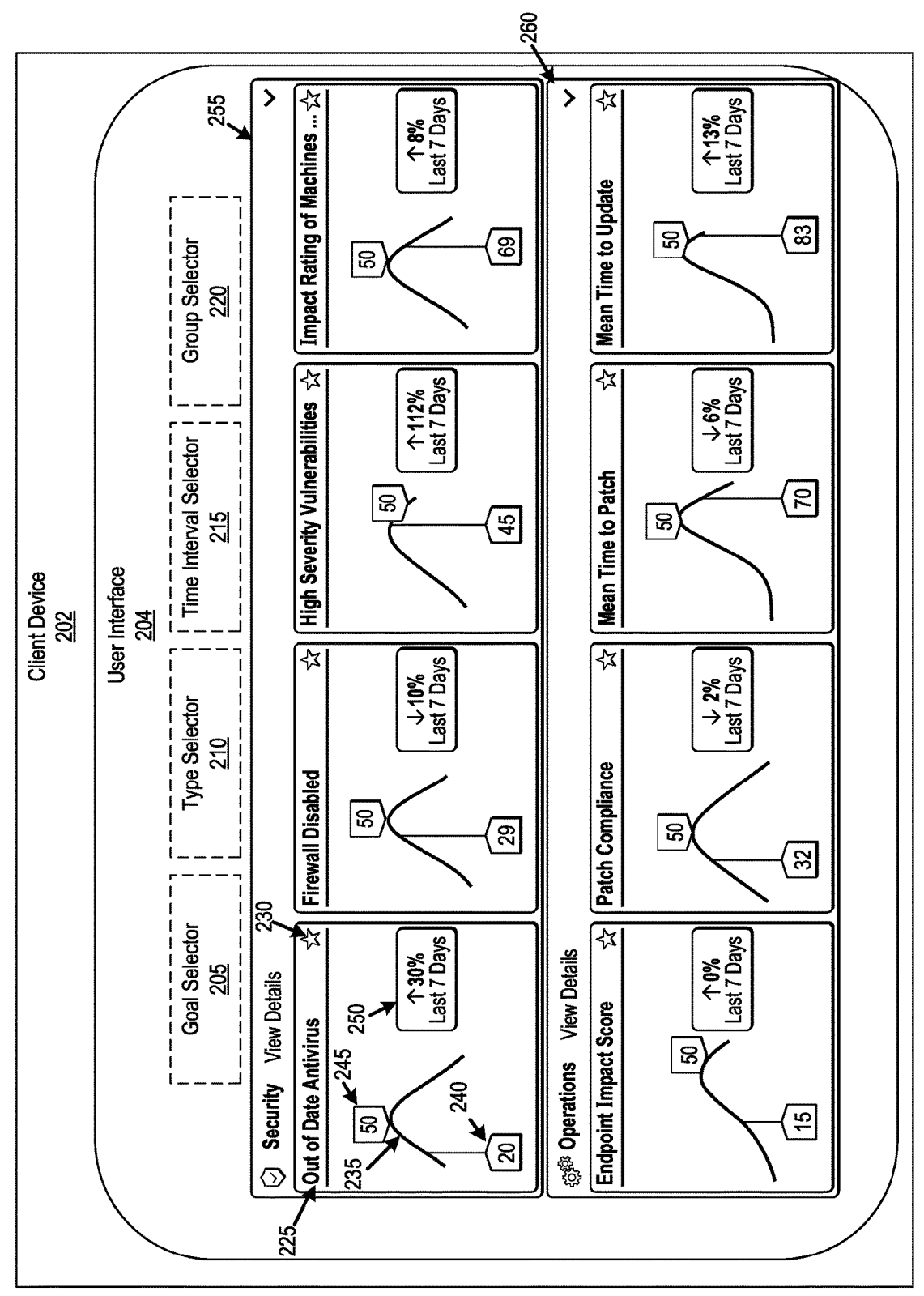
FIG. 2 illustrates an exemplary graphical user interface implemented on a user interface of a user device according to some example embodiments.

FIG. 2 illustrates an exemplary graphical user interface implemented on user interface 204 of client device 202 according to some example embodiments. Client device 202 can be one of the electronic devices 186 operating on one of networks 184. For example, client device 202 is electronic device 186A.Q of FIG. 1. Client device 202 includes at least one software application, which causes the display of a user interface 204, installed on or accessible by a network to a computing device. For example, user interface 204 can be caused to be displayed by a front-end portion of an application software system (e.g., software 328 of FIG. 3).

User interface 204 presents a dashboard. In some embodiments, user interface 204 can be used to: 1) select options for analyzing technology assessment metrics and generating curve-based GUI elements; and 2) displaying or otherwise perceiving output that includes information provided by curve element determiner 115. Examples of software that can cause display of the user interface 204 include web browsers, command line interfaces, and mobile apps.

User interface 204 may include a graphical user interface including goal selector 205, type selector 210, time interval selector 215, and/or group selector 220. Goal selector 205, type selector 210, time interval selector 215, and group selector 220 are control GUI elements that a user can interact with to change the curves generated. For example, as explained with reference to FIG. 1, a user can interact with goal selector 205 to select a percentile goal to be displayed on the part of the normal distribution curves to be displayed.

In some embodiments, user interface 204 includes a separate technology assessment metric GUI element 225 for each technology assessment metric. For example, the technology assessment metrics shown in FIG. 2 include: out of date antivirus, firewall disabled, high severity vulnerabilities, impact rating of machines, endpoint impact score, patch compliance, mean time to patch, and mean time to update. Each of these technology assessment metrics has its own technology assessment metric GUI element 225 as well as a curve GUI element 235, first indicator 240, second indicator 245, trending information 250, and an optional favorite indication 230.

Curve GUI element 235 is the GUI element representing at least a part of the normal distribution curve generated based on information provided by curve element determiner 115. In some embodiments, curve GUI element 235 only shows part of the normal distribution curve. For example, while the normal distribution curve may include x-axis values that extend into negative values, curve GUI element 235 only shows the part of the normal distribution curve that includes positive values. In one example, as shown in FIG. 2, for the technology assessment metric mean time to patch, zero days is the fastest that something can be patched and any negative values of the curve are not displayed. In some embodiments, curve GUI element 235 includes a relevant part of the normal distribution curve such that curve GUI element 235 fits legibly within technology assessment metric GUI element 225. In some embodiments, the highest value of the data values is on one side of the curve and the point where the value of the x-axis is equal to zero is on the other side of the curve.

In some embodiments, curve GUI element 235 is oriented such that one side of curve GUI element 235 is associated with a preferred value and the other side of curve GUI element 235 is associated with an unpreferred value. For example, curve GUI element 235 has higher values for the number of endpoints with an out of date antivirus on the left side of curve GUI element 235 and lower values on the right side. In such an example, the preferred values are the lower values on the right side, whereas the unpreferred values are on the left side. In some embodiments, every curve GUI element 235 has the same orientation such that the left side is always associated with the unpreferred values and the right side is always associated with the preferred values. Although described with the left side being associated with the unpreferred value, in some embodiments the right side is associated with unpreferred values and the left side is associated with preferred values.

Technology assessment metric GUI element 225 also includes first indicator 240. As explained with reference to FIG. 1, first indicator 240 is an indicator reflecting the percentile for the selected network on the normal distribution curve illustrated by curve GUI element 235. For example, curve element determiner 115 determines the percentile for a selected network by sorting all data values for the technology assessment metric from smallest to largest where the percentile is equal to the number of data values following the data value for the selected network divided by the total number of data values for the technology assessment metric and multiplied by 100. First indicator 240 can show the position on the normal distribution curve where the data value for the selected network lies as well as the percentile for that data value. For example, as shown in FIG. 2, first indicator 240 includes the number 20, indicating the data value for the selected network is in the $20^{th}$ percentile as well as a line indicating the position on curve GUI element 235 where the data value lies.

Technology assessment metric GUI element 225 also includes second indicator 245. As explained with reference to FIG. 1, second indicator 245 is an indicator showing a goal for the selected network's performance on the technology assessment metric. In some embodiments, a user can interact with goal selector 205 to change the goal and therefore change the position of second indicator 245. For example, although all second indicators 245 show a goal of $50^{th}$ percentile, a user can interact with goal selector 205 to change the goal to $75^{th}$ percentile. Embodiments may additionally or alternatively allow for the selection of other percentiles. Second indicator 245 can show the percentile goal for a selected network's performance on a given technology assessment metric as well as the position on curve GUI element 235 where that goal lies. The goal percentile shown in second indicator 245 reflects the percentage of networks with data values above a goal value set by the percentile.

Although illustrated as flags, first indicator 240 and second indicator 245 can be any shape or form (or even different shapes). For example, first indicator 240 and second indicator 245 can be circles, squares, ovals, triangles, etc. In some embodiments, the first and second indicators 240 are positioned on opposite sides of curve GUI element 235 to avoid clutter on the GUI as well as potential collisions between the two GUI elements. For example, as shown in FIG. 2, first indicator 240 is positioned below curve GUI element 235 whereas second indicator second indicator 245 is positioned above curve GUI element 235.

Technology assessment metric GUI element 225 also includes trending information 250. Trending information 250 can include the trend for the selected network's performance on a given technology assessment metric over time. For example, as shown in FIG. 2, although first indicator 240 shows that the selected network is in the $20^{th}$ percentile for the out of date antivirus technology assessment metric, trending information 250 indicates that the selected network has improved its performance by 30% in the last seven days. In some embodiments, the range of time over which trending information 250 is calculated is determined by time interval selector 215. For example, a user interacts with time interval selector 215 and selects a range of time over which the performance of the selected network is measured. In some embodiments, trending information 250 can include a single representation of the trend for the selected network's performance on the technology assessment metric. For example, trending information 250 can include an arithmetic symbol such as a plus sign or a minus sign or a directional indicator such as an upward arrow or a downward arrow. In some embodiments, as shown in FIG. 2, trending information 250 includes multiple representations of the trend for the selected network's performance on the technology assessment metric. For example, trending information 250 can include both an arithmetic symbol or a directional indicator as well as an amount changed in the range of time (e.g., percent change). In some embodiments, trending information 250 includes the range of time over which the trend information is calculated. In some embodiments, as shown in FIG. 2, trending information 250 is displayed in a box to the right of curve GUI element 235 within technology assessment metric GUI element 225.

Although only described with reference to the technology assessment metric for an out of date antivirus, the same techniques described above apply to all the technology assessment metrics. For example, user interface 204 can display multiple technology assessment metric GUI elements 225. In some embodiments, user interface 204 includes technology assessment metric combination GUI elements (sometimes referred to as panels). For example, as shown in FIG. 2, user interface 204 includes a first technology assessment metric combination GUI element 255 and a second technology assessment metric combination GUI element 260. First technology assessment metric combination GUI element 255 and second technology assessment metric combination GUI element 260 can each include multiple technology assessment metric GUI elements 225. For example, first technology assessment metric combination GUI element 255 includes a grid of technology assessment metric GUI element 225. In some embodiments, first technology assessment metric combination GUI elements also include a title for the combination. For example, second technology assessment metric combination GUI element 260 includes a title of operations. In some embodiments, a user selects the technology assessment metrics to include within each technology assessment metric combination and can create their own categories by interacting with the graphical user interface. Further details regarding technology assessment metric categories are described with reference to FIGS. 5-7B.

Figure 6:
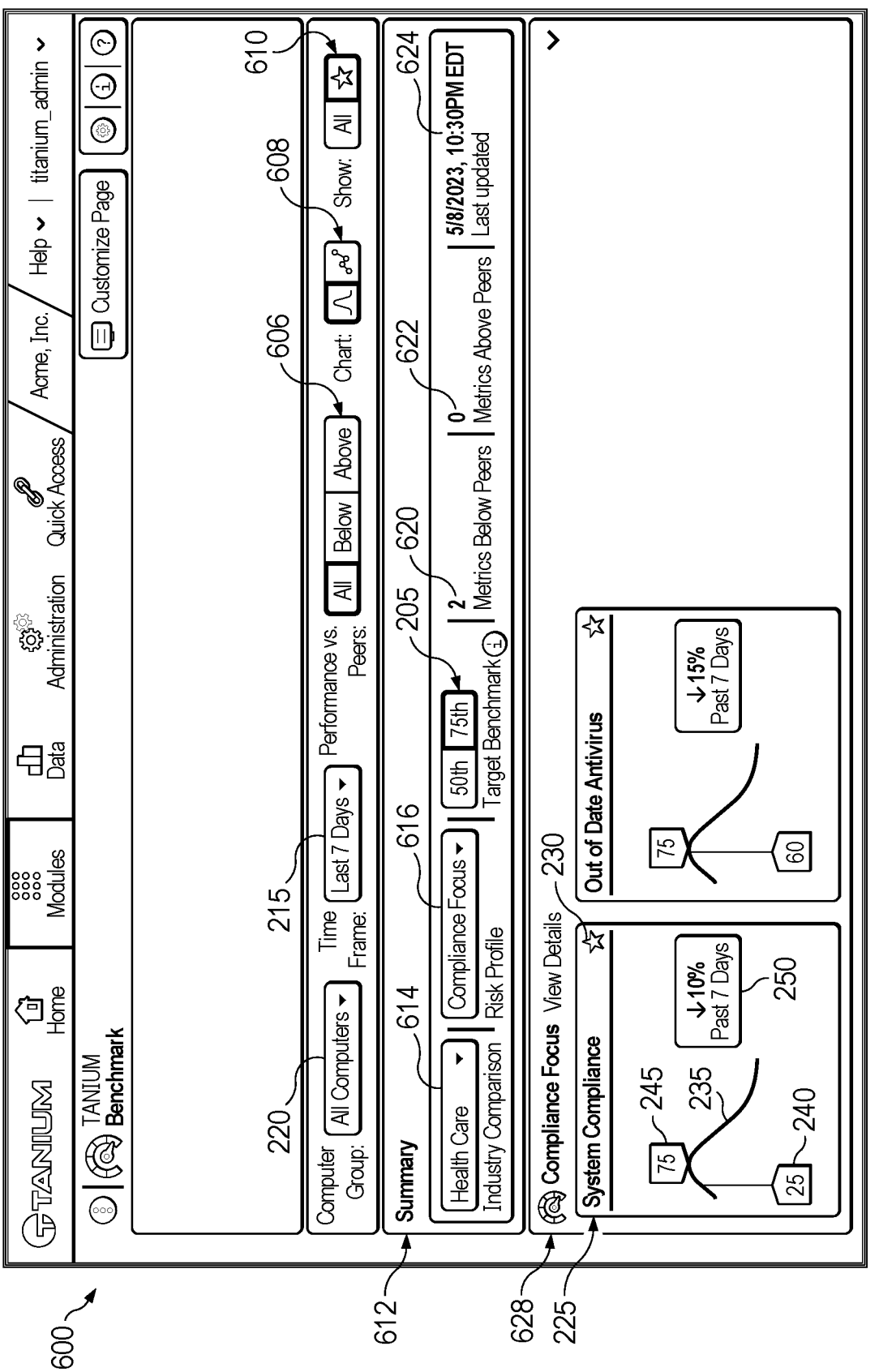
FIG. 6 illustrates another exemplary graphical user interface for displaying curve-based GUI elements as part of configuring a combination of technology assessment metrics for a group of enterprise networks according to some example embodiments.

Favorite indication 230 is an indicator showing whether the technology assessment metric has been favorited by a user of user interface 204. In some embodiments, a user of user interface 204 can interact with favorite indication 230 to cause the associated technology assessment metric to be favorited. Favorited technology assessment metrics can show up in the dashboard of the graphical user interface as shown in FIG. 6.

Figure 3:
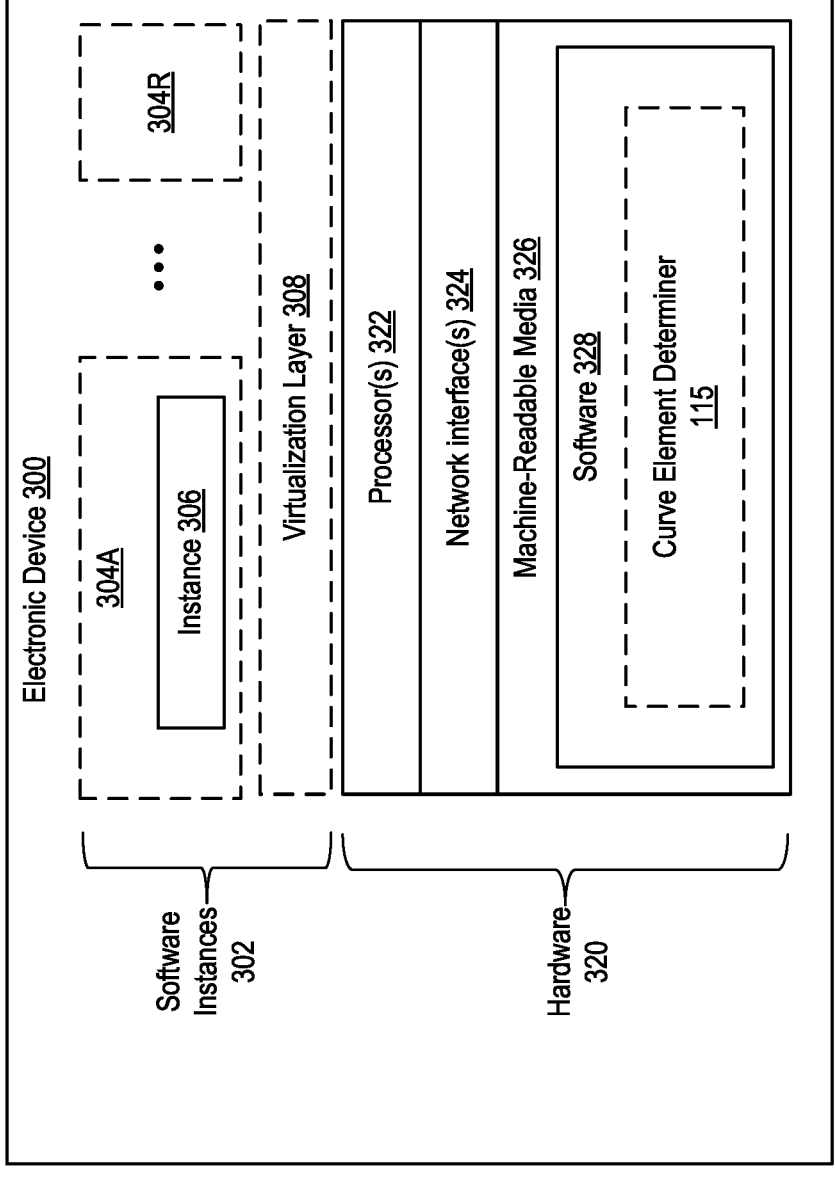
FIG. 3 is a block diagram illustrating an electronic device according to some example embodiments.

FIG. 3 is a block diagram illustrating an electronic device 300 according to some example embodiments. FIG. 3 includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. In the electronic devices 186 of FIG. 1 with GUI 120, the software 328 represents software to cause the display of user interfaces like that shown in FIG. 2. In electronic devices used to implement the cloud service(s) 142, the software 328 represents the software to implement the cloud service(s) 142, including curve element determiner 115. Different embodiments may divide differently the labor to produce user interfaces like that shown in FIG. 2. For instance, in some embodiments, most of the effort is performed by cloud service(s) 142, while in other embodiments most of the effort is performed by the electronic devices 186. By way of specific example, the software 328 in electronic devices 186 (at least those that include GUI 120) may represent just a browser, while the software 328 in electronic devices used to implement the cloud services 142 may generate the images to be displayed on the user interface 204. By way of another specific example, the software 328 in electronic devices used to implement the cloud services 142 may generate information (code and/or data usable to generate the GUI element, but not all of the underlying data values themselves) and send it to the electronic device 186 (at least those that include GUI 120), where the software 328 on those electronic devices use the information to generate the image for the GUI elements in user interface 204.

During operation, an instance of software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative embodiments of an electronic device may have numerous variations from that described above. For example, customized hardware and/or accelerators might also be used in an electronic device.

In some embodiments, hardware (e.g., a set of one or more server devices) and software provide cloud service(s) 142. In some embodiments, this hardware and software are in one or more datacenter(s). These datacenter(s) may be: 1) first party datacenter(s), which are datacenter(s) owned and/or operated by the same entity that provides and/or operates some or all of the software that provides the cloud service(s) 142; and/or 2) third-party datacenter(s), which are datacenter(s) owned and/or operated by one or more different entities than the entity that provides the cloud service(s) 142 (e.g., the different entities may host some or all of the software provided and/or operated by the entity that provides the cloud service(s) 142). For example, third-party datacenters may be owned and/or operated by entities providing public cloud services (e.g., Amazon.com, Inc. (Amazon Web Services), Google LLC (Google Cloud Platform), Microsoft Corporation (Azure)).

While the cloud service(s) 142 include the services previously described herein, some embodiments support additional services such as: asset discovery and inventory (also known as endpoint mapping); client management (including one or more of bare metal provisioning of new system and patching); monitoring activity in real time and reporting potential malicious behavior; identifying sensitive files on endpoints when they shouldn't be there (including looking inside of files); and threat hunting.

A user of an electronic device within or outside one of the networks 184 may communicate with the cloud service(s) 142 using TCP/IP (Transfer Control Protocol and Internet Protocol) and, at a higher network level, use other networking protocols to communicate, such as Hypertext Transfer Protocol (HTTP), a remote procedure call (RPC) framework (e.g., gRCP), an application program interface (API) based upon protocols such as Representational State Transfer (REST), etc. In an example where HTTP is used, an HTTP client, commonly referred to as a "browser," may be used on an electronic device to communicate HTTP messages with the cloud service(s) 142, thus allowing a user to access, process, and view information via pages and applications provided as part of the cloud service(s) 142, including allowing a user to interact with various GUI pages provided by the cloud service(s) 142.

FIG. 4 is a flow diagram of an example method 400 to analyze technology assessment metrics for a group of enterprise networks and generate a curve-based GUI element based on the analysis in accordance with some embodiments of the present disclosure. The method 400 can be performed by software executed by an electronic device. In some embodiments, method 400 is performed by curve element determiner 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the electronic device generates information to cause the display of a graphical user interface element reflecting how a selected enterprise network is performing on a technology assessment metric relative to other enterprise networks.

At operation 410, the electronic device determines, based on data values reflecting individual performance of the enterprise networks on the technology assessment metric, information to cause the display of a part of a normal distribution curve to be shown, a first point to be shown on the normal distribution curve indicating a percentile for the data value reflecting the individual performance of the selected network, and a second point along the normal distribution curve reflecting a goal. For example, curve element determiner 115 determines a mean and a standard deviation for the enterprise networks. Using the mean and standard deviation, curve element determiner 115 determines a normal distribution curve for the technology assessment metric. In some embodiments, curve element determiner 115 determines how to crop and orient the normal distribution curve as described with reference to FIGS. 1 and 2. Further details with regards to generating a GUI element reflecting how a selected enterprise network is performing on a technology assessment metric relative to other enterprise networks are described with reference to FIGS. 1-3.

At operation 415, the electronic device sends, to a client device, information to cause the display of the GUI element to be presented in a dashboard on the GUI of the client device. For example, curve element determiner 115 sends information to cause the normal distribution curve determined at operations 405 and 410 along with the first point (such as first indicator 240 of FIG. 2) indicating the percentile for the data value reflecting the individual performance of the selected network and the second point reflecting a goal (such as second indicator 245) to be displayed on GUI 120A.x. Further details with regards to sending the GUI element to be presented in a dashboard of the GUI of the client device are described with reference to FIGS. 1-3.

Figure 5:
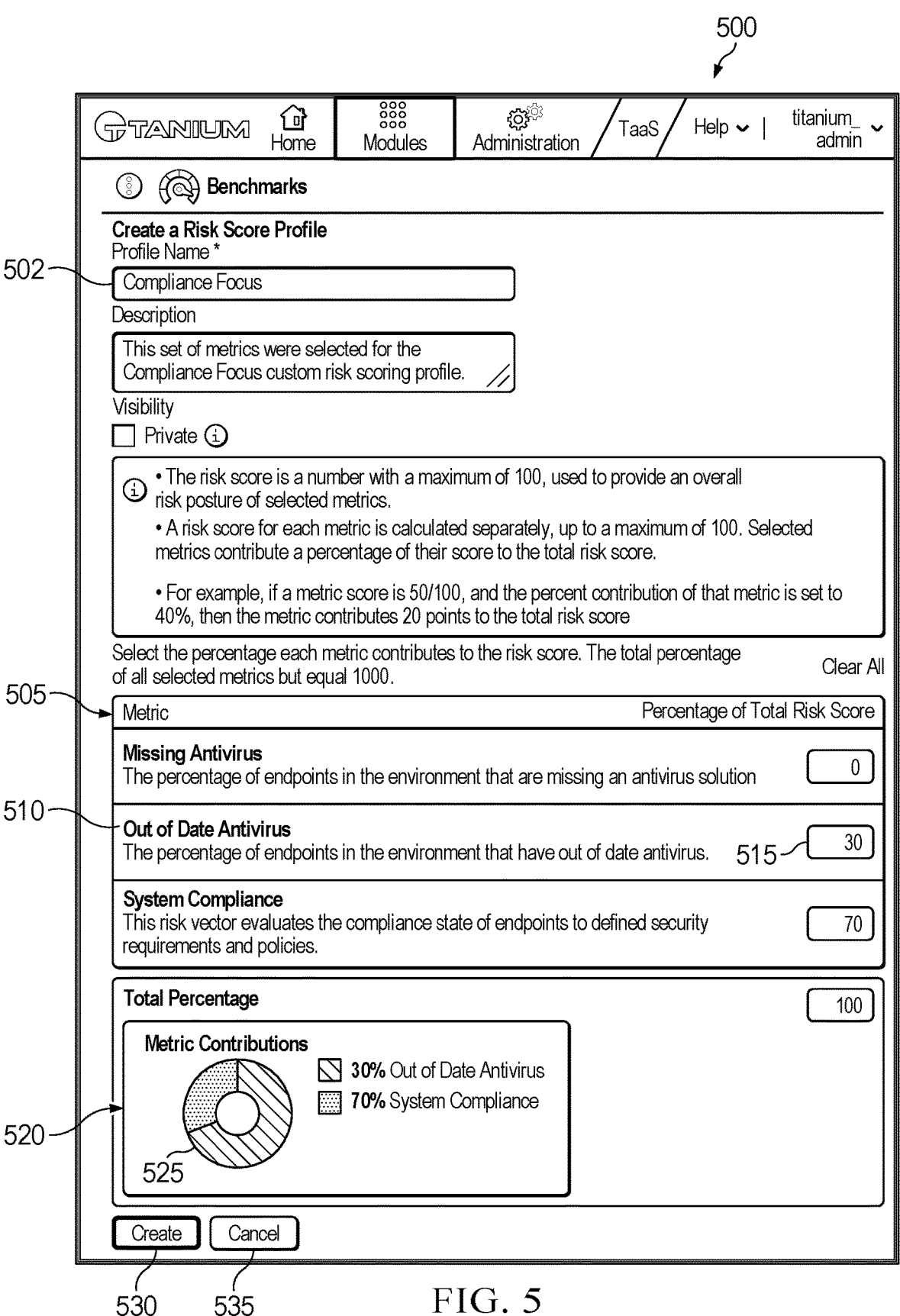
FIG. 5 illustrates an exemplary graphical user interface for configuring a combination of technology assessment metrics for a group of enterprise networks according to some example embodiments.

Exemplary Manner of Configuring and Displaying a Combination of Technology Assessment Metrics FIG. 5 illustrates an exemplary graphical user interface for configuring a combination of technology assessment metrics for a group of enterprise networks according to some example embodiments. As shown in FIG. 5, graphical user interface 500 can include a technology assessment metric combination name 502 (also referred to as a risk score profile or custom risk score profile) and a technology assessment metric display 505 including the following selectable technology assessment metrics 510: administrative access, end of life operating systems, end of life software, endpoint impact score, expired certificates, firewall disabled, high severity of vulnerabilities, insecure Transport Layer Security (TLS)/Secure Sockets Layer (SSL), known exploits, legacy operating systems, mean time to patch, mean time to update software, missing antivirus, missing disk encryption, out of date antivirus, password identification, patch compliance, software update compliance, system compliance, system vulnerability, unmanaged devices, and user impact score.

In some embodiments, a user can interact with risk score percentage interface 515 to create a risk score profile by choosing which technology assessment metrics to include in the risk score profile and choosing what proportion of those technology assessment metrics to use. For example, a user can select a risk score profile including 30% out of date antivirus technology assessment metric and 70% system compliance technology assessment metric. The selected technology assessment metrics of the selectable technology assessment metrics 510 are included in the technology assessment metric combination. In some embodiments, technology assessment metric combination is saved and displayed later in a graphical user interface such as first technology assessment metric combination GUI element 255 of FIG. 2. A user of graphical user interface 500 can interact with technology assessment metric combination name 502 to input a name for the technology assessment metric combination. For example, as shown in FIG. 5, a user can input the name Compliance Focus. In some embodiments, the user can interact with graphical user interface 500 to input a description for the technology assessment metric combination.

Graphical user interface 500 also includes percentage GUI element 520 for the technology assessment metric combination. Percentage GUI element 520 indicates the contributions of the selected technology assessment metrics to the technology assessment metric combination based on the information input into risk score percentage interface 515. For example, percentage GUI element 520 includes a metric contributions section showing that out of date antivirus contributes 30% and system compliance contributes 70%. Percentage GUI element 520 can include a graph GUI element 525. In some embodiments, graph GUI element 525 is a pie chart showing the contributions of the selected technology assessment metrics to the technology assessment metric combination based on the information input into risk score percentage interface 515.

Graphical user interface 500 also includes create button 530 and cancel button 535. Curve element determiner 115 creates a technology assessment metric combination with the information input in graphical user interface 500 upon receiving an indication that a user interacted with create button 530. A user interacting with cancel button 535, however, results in the technology assessment metric combination not being created.

FIG. 6 illustrates another exemplary graphical user interface for displaying-curve-based GUI elements as part of configuring a combination of technology assessment metrics for a group of enterprise networks according to some example embodiments. Graphical user interface 600 includes a summary GUI element 612 and compliance focus technology assessment combination GUI element 628. Graphical user interface 600 also includes group selector 220, time interval selector 215, peer network selector 606, curve display selector 608, and favorite selector 610.

Group selector 220 is a GUI element that a user can interact with to select a group of devices to include in the generation of the normal distribution curves. Group selector can include device categories such as device operating system and department to which device belong (e.g., human resources, legal, engineering, etc.) as well as other categories for devices in enterprise networks. Further details with regard to group selector 220 are described with reference to FIGS. 1 and 2.

Time interval selector 215 is a GUI element that a user can interact with to select a range of time over which to generate a normal distribution curve. In some embodiments, the range of time identified by time interval selector 215 is used to determine trend information such as trending information 250. Further details with regard to group selector 215 are described with reference to FIGS. 1 and 2.

Peer network selector 606 is a GUI element that can be considered a type selector 210. For example, a user can interact with peer network selector 606 to select a certain criteria for networks. A user interacts with peer network selector 606 and can select whether to include all networks or only networks that are either above or below its performance. Further details with regard to type selector 215 are described with reference to FIGS. 1 and 2.

Curve display selector 608 is a GUI element that a user can interact with to change a style of the curve GUI elements 235. For example, a user can select a normal distribution curve generated based on the range of time indicated by time interval selector 215 or the user can select a discrete curve showing the actual data values over the range of time. Further details with regard to the discrete curve are described with reference to FIGS. 7A and 7B.

Favorite selector 610 is a GUI element that a user can interact with to determine which technology assessment metrics are displayed. For example, as described with reference to FIG. 2, a user can interact with favorite selector 610 such that graphical user interface 600 only shows technology assessment metric GUI elements 225 that have been favorited.

Summary GUI element 612 includes industry selector 614, technology assessment metric combination selector 616, goal selector 205, numerical indicators 620 and 622, and update time 624. Industry selector 614 is a GUI element that can be considered a type selector 210. For example, a user can interact with industry selector 614 to select a certain criterion for networks. A user interacts with industry selector 614 and can select an industry such that technology assessment metric GUI elements 225 are generated using data values for networks within the selected industry. Further details with regard to type selector 215 are described with reference to FIGS. 1 and 2.

Technology assessment metric combination selector 616 is a GUI element that a user can interact with to select one of the technology assessment metric combinations, and its selection will cause the display of the technology assessment metrics included in that combination. For example, as shown in FIG. 6, technology assessment metric combination selector 616 indicates that the technology assessment metric combination named compliance focus (e.g., compliance focus technology assessment combination GUI element 628) shown be shown. Goal selector 205 is a GUI element that a user can interact with to select goals to be displayed as second indicators 245 on technology assessment metric GUI elements 225. Further details with regard to goal selector 205 are described with reference to FIGS. 1 and 2.

Numerical indicator 620 is a GUI element that shows the number of technology assessment metrics where the selected network does not meet the goal indicated by goal selector 205 whereas numerical indicator 622 is a GUI element that shows the number of technology assessment metrics where the selected network does meet the goal indicated by goal selector 205. Update time 624 is a GUI element that shows the last update time for the information displayed by graphical user interface 700. In some embodiments, in response to receiving new information and updating exemplary graphical user interface 700, the update time 624 is edited to reflect a new time.

Compliance focus technology assessment combination GUI element 628 includes the technology assessment metric GUI elements 225 included in the combination: system compliance and out of date antivirus. The technology assessment metric GUI elements 225 are determined by the technology assessment combination as created in FIG. 5.

Figure 7B:
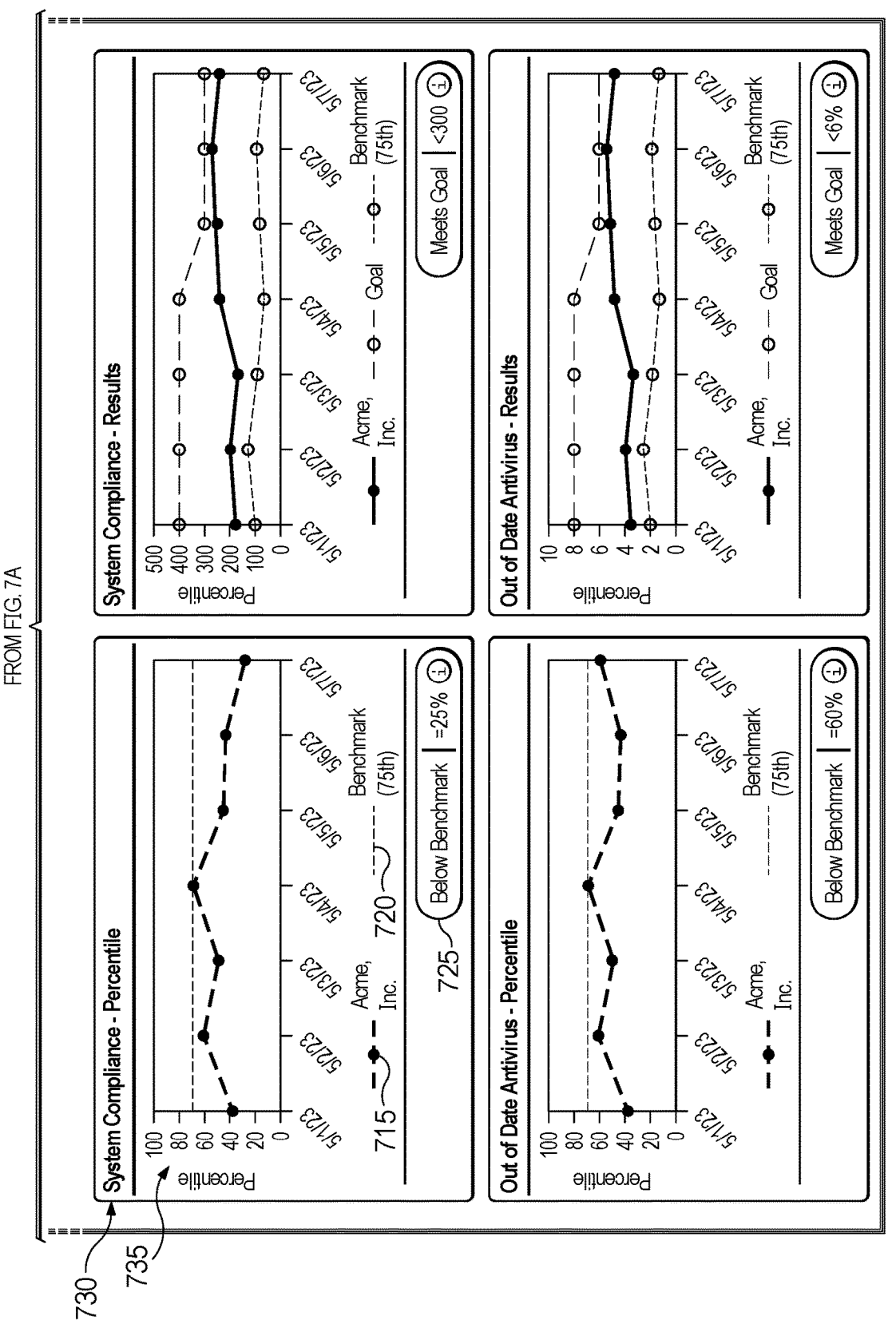

FIGS. 7A and 7B illustrates another exemplary graphical user interface for displaying a configured combination of technology assessment metrics for a group of enterprise networks according to some example embodiments. Graphical user interface 700 shows a view for compliance focus technology assessment combination GUI element 628. For example, compliance focus technology assessment combination GUI element 628 includes weighted technology assessment combination GUI element 705 and technology assessment metric trend GUI elements 730. Weighted technology assessment combination GUI element 705 includes weighted technology assessment combination curve GUI element 710. Weighted technology assessment combination curve GUI element 710 shows the trend for the weighted combination of technology assessment metrics defined in FIG. 5 over the range of time indicated by time interval selector 215. For example, as shown in FIG. 7A, weighted technology assessment combination GUI element 710 shows the data values for the selected network indicated by network indicator 715 over the range of time indicated by time interval selector 215 as well as the data values for the goal indicated by goal indicator 720 (set by user interaction with goal selector 205) over the range of time.

Weighted technology assessment combination GUI element 710 also includes a trend analysis goal indicator 725 which indicates whether the selected network's performance for the technology assessment combination meets the goal. For example, as shown in FIG. 7A, goal indicator 725 indicates that the selected network meets the goal (e.g., has a risk score less than 400) for the entirety of the range of time. In some embodiments, trend analysis goal indicator 725 includes a percentile indicating the amount of the range of time where the selected networks performance for the technology assessment combination meets the goal. For example, as shown in FIG. 7B, goal indicator 725 indicates that the selected network does not meet the goal (e.g., is below the benchmark) for 25% of the range of time.

Technology assessment metric trend GUI elements 730 are GUI elements showing the trend for the selected network's performance for the technology assessment metric in the technology assessment metric combination. Technology assessment metric trend GUI elements 730 include technology assessment metric GUI elements 735 as well as network indicator 715 and goal indicator 720. For example, as shown in FIG. 7B, the bottom line graph indicated by network indicator 715 shows the score for the system compliance technology assessment metric over the range of time indicated by time interval selector 215. The top line graph indicated by goal indicator 720 shows the goal for the technology assessment metric over the same range of time.

Collection and Assessment of Data Values from Enterprise Networks

Returning to FIG. 1, the data values used by the curve element determiner 115 may be collected one or more different ways. By way of example, in some embodiments the data values are collected using client software. More specifically, entities within a network are classified as endpoints or network elements/network devices (an electronic device that communicatively interconnects other electronic devices on the network, where these other electronic devices may themselves be operating as network devices or endpoints). While each of the electronic devices 186B.A-186B.R is generally referred to herein as an endpoint, alternative embodiments are implemented to participate at a lower level of granularity (e.g., if a given one of the electronic devices 186B.A-186B.R supports virtualization (see additional discussion below), then each of a set of one or more software containers hosted on that electronic device may be separately considered an endpoint). In such embodiments, there may be only one instance of the client software per electronic device 186B.A-186B.R, or one per software container hosted on each of the electronic devices 186B.A-186B.R. The term electronic device is defined in more detail below.

The client software, when executed by one of the electronic devices, causes the electronic device to: 1) scan that electronic device to collect information regarding the current state of that electronic device; and 2) communicate that information out of that electronic device. For instance, the scan is one that collects information that may be used to measure technology assessment metrics of the electronic device and the network it belongs to. The scan may reflect a request for a technical validation against specific benchmarks. Each of these scans can be viewed as a query to collect local results from the electronic devices in any of networks 184A through 184V. Cloud service(s) 142 and curve element determiner 115 receive the results from any or all the networks 184. By way of non-limiting example, information regarding the state of endpoints for networks 184 may include or reflect the respective organization's overall size, asset landscape, network architecture, endpoint state, endpoint usage, energy expenditures, compliance, vulnerabilities, file registry changes, log file contents, presence of sensitive or personal data, location of managed and unmanaged assets, patching, threat presence and response, applied software policies, and network and endpoint performance, other cyber risk assessment information, among others. In some embodiments, cloud service(s) 142 and/or curve element determiner 115 store the received results (e.g., in a database).

This technique enables the automation of assessments (e.g., cyber risk assessments of the technical controls, other IT infrastructure assessments, etc.) within networks based on a current state of electronic devices within that network. Put another way, data internal to the organizations 190 that pertains to the state/risk inside the respective organization's environment (electronic devices) within the network is provided to cloud service(s) 142. For example, this allows an organization to compare itself with peers regarding the security of its vendor/supplier's network (which is sometimes referred to vendor security assessment/risk and compliance management, a security status, a security assessment, a risk assessment, compliance with a security factor, and evaluating the security of and associated risk of relying on a second organization operating an enterprise network with which a plurality of electronic devices are communicatively connected).

The data values received by curve element determiner 115 from each of the networks 184 may be organized in a variety of ways, some of which are referred to as security status information, security metrics, risk ratings, etc.

Further, in the case where the electronic devices for which the current state is collected are endpoints, this technique enables the comparison of many organizations' networks based on a current state of endpoints within those networks. Put another way, organizations can use data from cloud service(s) 142 to compare their networks against real internal data from networks both vertical and horizontal to the organization.

As indicated above, the assessment is based on the current state. The client software on each of the electronic devices 186A.A-186A.Q, 186B.A-186B.R, 186C.A-186C.S, 186D.A-186D.T, and 186V.A-186V.Z is collecting state information regarding the electronic devices (e.g., endpoints) on which that client software is executing. Since this information is current as of the time of collection, since the process of collecting it is automated, and since it is collected from the electronic devices (e.g., endpoints) themselves, the technique provides for near real-time results. In other words, the data values are based on data collected from the electronic devices (e.g., endpoints) themselves.

Also, the assessment performed by the technique described herein is provable by the state of electronic devices (e.g., endpoints) because the technique described herein provides a result based on data collected from the electronic devices (e.g., endpoints) themselves. Thus, the technique described herein can be used to analyze high quality and accurate data and generate curves based on this data to better illustrate the condition of a network when compared to similar networks (e.g., both vertical and horizontal).

While the client software is described as participating on behalf of each of the electronic devices 186, alternative embodiments are implemented to participate at a lower level of granularity (e.g., if a given one of the electronic devices 186 supports virtualization (see additional discussion below), than each of a set of one or more software containers may participate separately). In such embodiments, there may still be only one instance of the client software on the electronic device, or one per each software container in the set of software containers.

Electronic Devices and Machine-Readable Media

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, endpoints, or end user devices; or more specifically referred to as mobile devices, desktops, desktop computers, workstations, laptops, personal digital assistants, smartphones, wearables, augmented reality (AR) devices, virtual reality (VR) devices, mixed reality (MR) devices, embedded devices, Internet-of-Things devices (e.g., cameras, lighting, refrigerators, security systems, smart speakers, and thermostats), etc. The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments, the invention is not limited to the embodiments described and can be practiced with modification and alteration within the spirit and scope of the appended claims. The description is thus illustrative instead of limiting.

What is claimed is:

1. A system comprising:
   at least one memory device; and
   a processing device, operatively coupled with the at least one memory device, to:
       generate information to cause a display of a graphical user interface (GUI) element reflecting how a selected enterprise network of a plurality of enterprise network is performing on a technology assessment metric of a plurality of technology assessment metrics relative to the other enterprise networks in the plurality of enterprise networks, wherein the generating includes:
           determining, based on data values reflecting individual performance of the plurality enterprise networks on the technology assessment metric, a part of a normal distribution curve to be shown, a first point to be shown on the part of the normal distribution curve indicating a percentile for the data value reflecting the individual performance of the selected enterprise network, and a second point along the part of the normal distribution curve reflecting a goal for the individual performance of the selected enterprise network, and a third point to be shown along the part of the normal distribution curve reflecting an alternative goal for the individual performance of the selected enterprise network; and send, to a client device, information to cause the GUI element to be presented in a dashboard on the graphical user interface of the client device, wherein the dashboard includes a control GUI element that allows a user to change from the GUI element showing the goal to the GUI element showing the alternative goal.

2. The system of claim 1, wherein, the GUI element shows:

a first indicator identifying the first point and the percentile; and a second indicator identifying the second point and a second percentile representing the goal.

3. The system of claim 2, wherein the dashboard further includes:

a control GUI element that allows a user to select which enterprise networks are included the plurality of enterprise networks.

4. The system of claim 1, wherein generating the GUI element comprises:

determining trending information comprising a direction of change in the individual performance of the selected enterprise for the technology assessment metric and an amount of change in the individual performance of the selected enterprise for the technology assessment metric.

5. The system of claim 1, wherein the goal and the alternative goal are respectively a $50^{th}$ percentile and a $75^{th}$ percentile.

6. The system of claim 1, wherein a location of the first point relative to a location of the second point on the part of the normal distribution curve reflects how close the selected enterprise network is to the goal.

7. A method comprising:

generating information to cause a display of a graphical user interface (GUI) element reflecting how a selected enterprise network of a plurality of enterprise network is performing on a technology assessment metric of a plurality of technology assessment metrics relative to the other enterprise networks in the plurality of enterprise networks, wherein the generating includes:

determining, based on data values reflecting individual performance of the plurality enterprise networks on the technology assessment metric, a part of a normal distribution curve to be shown, a first point to be shown on the part of the normal distribution curve indicating a percentile for the data value reflecting the individual performance of the selected enterprise network, and a second point along the part of the normal distribution curve reflecting a goal for the individual performance of the selected enterprise network, and a third point to be shown along the part of the normal distribution curve reflecting an alternative goal for the individual performance of the selected enterprise network; and sending, to a client device, the information to cause the display of the GUI element to be presented in a dashboard on the graphical user interface of the client device, wherein, the GUI element shows:

a first indicator identifying the first point and the percentile; and a second indicator identifying the second point and a second percentile representing the goal; and wherein the dashboard includes a control GUI element that allows a user to change from the GUI element showing the goal to the GUI element showing the alternative goal.

8. A non-transitory machine-readable storage medium that provides instructions that, if executed by a hardware, are configurable to cause the hardware to perform operations comprising:

generating information to cause a display of a graphical user interface (GUI) element reflecting how a selected enterprise network of a plurality of enterprise network is performing on a technology assessment metric of a plurality of technology assessment metrics relative to the other enterprise networks in the plurality of enterprise networks, wherein the generating includes:

determining, based on data values reflecting individual performance of the plurality enterprise networks on the technology assessment metric, a part of a normal distribution curve to be shown, a first point to be shown on the part of the normal distribution curve indicating a percentile for the data value reflecting the individual performance of the selected enterprise network, and a second point along the part of the normal distribution curve reflecting a goal for the individual performance of the selected enterprise network, and a third point to be shown along the part of the normal distribution curve reflecting an alternative goal for the individual performance of the selected enterprise network; and sending, to a client device, the information to cause the display of the GUI element to be presented in a dashboard on the graphical user interface of the client device, wherein the dashboard includes a control GUI element that allows a user to change from the GUI element showing the goal to the GUI element showing the alternative goal.

9. The non-transitory machine-readable storage medium of claim 8, wherein, the GUI element shows:

a first indicator identifying the first point and the percentile; and a second indicator identifying the second point and a second percentile representing the goal.

10. The non-transitory machine-readable storage medium of claim 8, wherein the goal and the alternative goal are respectively a $50^{th}$ percentile and a $75^{th}$ percentile.

11. The non-transitory machine-readable storage medium of claim 8, wherein the dashboard further includes:

a control GUI element that allows a user to select which enterprise networks are included the plurality of enterprise networks.

12. The non-transitory machine-readable storage medium of claim 8, wherein different widths of the normal distribution curve reflect a relative commonality of the respective data values reflecting individual performance of the plurality of enterprise networks on the respective technology assessment metric.

13. The non-transitory machine-readable storage medium of claim 8, wherein a location of the first point relative to a location of the second point on the part of the normal distribution curve reflects how close the selected enterprise network is to the goal.

14. The non-transitory machine-readable storage medium of claim 8, wherein a priority of the GUI element is identified by a combination of:

a width of the part of the normal distribution curve, and a location of the first point on the part of the normal distribution curve.

15. The non-transitory machine-readable storage medium of claim 14, wherein the priority for the GUI element is higher when the width of the part of the normal distribution curve is narrower and when the location of the first point on the part of the normal distribution curve reflects the individual performance of the selected enterprise network for the technology assessment metric is falling short of the goal.

16. The non-transitory machine-readable storage medium of claim 8, wherein generating the GUI element comprises:

determining trending information comprising a direction of change in the individual performance of the selected enterprise for the technology assessment metric and an amount of change in the individual performance of the selected enterprise for the technology assessment metric.

17. The non-transitory machine-readable storage medium of claim 16, wherein the operations further comprise:

determining the trending information is based on a first range of time, wherein the amount of change and the direction of change are based on a first percentile reflecting the individual performance of the selected network during the first range of time and a second percentile reflecting the individual performance of the selected network prior to the first range of time.

18. The non-transitory machine-readable storage medium of claim 17, wherein the dashboard further includes a control GUI element that allows a user to change from the first range of time to a second range of time.

19. The non-transitory machine-readable storage medium of claim 8, wherein determining the part of the normal distribution curve includes:

determining a mean and a standard deviation based on the data values reflecting individual performance of the plurality enterprise networks; and determining a placement, a shape, and an orientation of the part of the normal distribution curve to be shown in the GUI element based on the mean and the standard deviation.

20. The non-transitory machine-readable storage medium of claim 19, wherein determining the orientation of the part of the normal distribution curve comprises:

orienting the part of the normal distribution curve such that a first side of the part of the normal distribution curve, when presented on the graphical user interface, is associated with a preferred value and a second side of the part of the normal distribution curve, when presented on the graphical user interface, is associated with an unpreferred value.

* * * * *